(12) United States Patent
Kou et al.

(10) Patent No.: US 11,053,334 B2
(45) Date of Patent: Jul. 6, 2021

(54) MONOMERS AND POLYMERS

(71) Applicant: BASF SE, Ludwigshafen am Rhein (DE)

(72) Inventors: Huiguang Kou, Ludwigshafen (DE);
Clemens Auschra, Ludwigshafen (DE);
Frank Pirrung, Ludwigshafen (DE);
Dario Perera-Diez, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 245 days.

(21) Appl. No.: 16/343,594

(22) PCT Filed: Oct. 24, 2017

(86) PCT No.: PCT/EP2017/077159
§ 371 (c)(1),
(2) Date: Apr. 19, 2019

(87) PCT Pub. No.: WO2018/082970
PCT Pub. Date: May 11, 2018

(65) Prior Publication Data
US 2020/0048388 A1    Feb. 13, 2020

(30) Foreign Application Priority Data
Nov. 4, 2016   (EP) .................... 16197236

(51) Int. Cl.
| | |
|---|---|
| *C08F 220/58* | (2006.01) |
| *C08F 290/14* | (2006.01) |
| *C08F 283/06* | (2006.01) |
| *C08F 20/58* | (2006.01) |
| *C08F 290/06* | (2006.01) |
| *C09D 7/43* | (2018.01) |
| *C09D 7/45* | (2018.01) |
| *C08F 212/08* | (2006.01) |
| *C08F 220/06* | (2006.01) |
| *C08F 220/18* | (2006.01) |
| *C08F 226/06* | (2006.01) |
| *C09D 5/02* | (2006.01) |
| *C08F 120/58* | (2006.01) |

(52) U.S. Cl.
CPC ............ *C08F 220/58* (2013.01); *C08F 20/58* (2013.01); *C08F 220/585* (2020.02); *C08F 283/06* (2013.01); *C08F 290/062* (2013.01); *C08F 290/142* (2013.01); *C08F 120/58* (2013.01); *C08F 212/08* (2013.01); *C08F 220/06* (2013.01); *C08F 220/18* (2013.01); *C08F 226/06* (2013.01); *C09D 5/027* (2013.01); *C09D 7/43* (2018.01); *C09D 7/45* (2018.01)

(58) Field of Classification Search
CPC .. C08F 220/58; C08F 220/585; C08F 120/58; C08F 20/58; C08F 283/06; C08F 290/062; C08F 290/142
See application file for complete search history.

(56) References Cited

U.S. PATENT DOCUMENTS

| | | | | |
|---|---|---|---|---|
| 4,130,702 A | * | 12/1978 | Choe ................. | C08F 20/58 526/229 |
| 2002/0132890 A1 | | 9/2002 | Ramesh et al. | |
| 2004/0048959 A1 | | 3/2004 | Ramesh et al. | |
| 2016/0102198 A1 | | 4/2016 | Kou et al. | |

FOREIGN PATENT DOCUMENTS

| | | |
|---|---|---|
| WO | 02/051948 A2 | 7/2002 |
| WO | 2007/039603 A2 | 4/2007 |
| WO | 2008/080580 A2 | 7/2008 |
| WO | 2014/195440 A1 | 12/2014 |

OTHER PUBLICATIONS

U.S. Appl. No. 15/524,144, filed May 3, 2017, U.S. Pat. No. 10,131,750, Huiguang Kou.
U.S. Appl. No. 15/536,525, filed Jun. 15, 2017, US 2017-0362351 A1, Huiguang Kou.
U.S. Appl. No. 15/998,745, filed Aug. 16, 2018, US 2019-0092903 A1, Huiguang Kou.
Extended European Search Report dated Mar. 21, 2017 in Patent Application No. 16197236.9.
International Search Report dated Nov. 15, 2017 in PCT/EP2017/077159 filed on Oct. 24, 2017.

* cited by examiner

*Primary Examiner* — Ling Siu Choi
*Assistant Examiner* — David L Miller
(74) *Attorney, Agent, or Firm* — Faegre Drinker Biddle & Reath LLP

(57) ABSTRACT

The presently claimed invention relates to novel monomers which can be used for preparing polymers which are useful as dispersants for pigments and fillers, as wetting agent and as thickening agents in liquid compositions.

18 Claims, No Drawings

MONOMERS AND POLYMERS

The presently claimed invention relates to novel monomers which can be used for preparing polymers which are useful as dispersants for pigments and fillers, as wetting agent and as thickening agents in liquid compositions.

BACKGROUND OF INVENTION

Pigments are organic or inorganic dry powders that incorporate a mixture of primary particles, aggregates and agglomerates. For both industrial and consumer coating compositions, whether solvent borne or water borne, the pigment should be dispersed homogeneously throughout the coating composition in order to ensure a uniform appearance of the final coating. To be properly dispersed, pigments are usually wetted, disaggregated and deagglomerated in a vehicle to obtain a dispersion of the pigment particles. Wetting involves incorporation of the pigment into the vehicle replacing pigment-air interfaces with pigment-vehicle interfaces. Wetting agents facilitate bringing pigments into a dispersed state as a result of surface activity at the pigment-solution interface. An ideal pigment dispersion consists of a homogenous suspension of particles, after reducing the size of any aggregates and agglomerates.

While some organic vehicles may be good pigment wetting agents, dispersants are typically added to the liquid vehicle to ensure thorough pigment dispersion throughout the vehicle. Dispersants can also be used to temporarily stabilize the pigment dispersion from re-aggregating and re-agglomerating.

Liquid pigment compositions containing pigments and fillers and a liquid vehicle are used in an almost unlimited number of different technical applications, in particular for colouring coating compositions, including solvent and water-borne paints, heavy duty coatings, automotive coatings, in printing inks, or for colouring cosmetics, plastics, etc.

The function of dispersants is manifold. Mainly, they act as stabilizers for the solid fine particulate materials in the liquid pigment compositions, i.e. the dispersant separates the particles of the solid fine particulate material and, thus, prevents them from coagulation or clumping and settling from the liquid vehicle. They also may act as solubilizers in the given carrier liquid of a coating composition. Dispersants may also improve the optical properties of the coatings, such as gloss, colour intensity or rub-out characteristics. Depending on the type and polarity of the vehicle, e.g. water, organic solvents or mixtures thereof, polymers of variable structure are used as dispersants.

Sometimes, dispersants act as flow control assistants and bring about improved spreading of the composition over the surface of the substrate, and improve flow of the polymer film which forms in the course of curing, resulting in a smooth surface. On account of their capacity to promote the flow of the polymer film, which forms in the course of curing, these agents reduce the formation of defects, known as craters, which are caused by impurities acting from the outside or by impurities on the surface of the substrate.

A general survey on the different types of polymeric dispersants, their polymeric architecture and their properties is given by F. Pirrung and C. Auschra in Macromolecular Engineering, Precise Synthesis, Materials Properties, Applications (ed. K. Matyjaszewski et al.), chapter 4, polymeric dispersants, pp. 2135-2180.

Occasionally, the use of comb copolymers, in particular those based on styrene and maleic anhydride (so called SMA resins), as wetting and dispersing agents for pigment and filler dispersions, has been described. The backbone of said comb polymers is usually designed as anchoring groups which have affinity onto the solid particle surface and thereby provide a strong physical binding of the dispersant to the solid particles. Their side chains can interact with the dispersant phase to build up a steric environment to stabilize particle dispersion.

WO 2002/051948 describes pigment dispersants which are comb polymers obtained by polymerizing an acrylate monomer, a vinylaromatic hydrocarbon monomer, a non-functional polyalkylene glycol acrylate or methacrylate monomer and a functional polyalkylene glycol acrylate or methacrylate monomer having a hydroxyl group subsequently reacting the thus obtained comb polymer with an acid having a first functional acid group reactive with said hydroxyl group, and a second functional acid group capable of providing an acid anion group.

WO 2007/039603 describes a pigment dispersant which is a comb polymer having pendent hydrophilic polyalkylene oxide side chains which are obtained e.g. by reacting an SMA type polymer with a polyalkyleneoxide amine.

WO 2008/080580 describes modified comb copolymers based on SMA resins and their use as wetting and dispersing agents, where the comb copolymers are obtained by converting SMA resins with one of the following mixtures (a) to (c), where (a) is a mixture of at least one polyalkylene oxide monoamine and at least one amino alcohol; (b) is a mixture of at least one polyalkylene oxide monoamine and at least one N,N-disubstituted diamine, (c) is a mixture of at least one polyalkylene oxide monoamine, at least one N,N-disubstituted diamine and at least one polymer selected from the group of monohydroxy-terminated polyalkylene oxides, monohydroxy-terminated polyesters and monohydroxy-terminated block copolymers comprising polyalkylene oxide and polyester blocks. These comb copolymers may be further modified by converting the hydroxy-terminated side chains to phosphoric acid ester groups or by converting N,N-disubstituted aminoterminated side chains to quaternary ammonium salts.

WO 2014/195440 describes comb polymers that are prepared by reacting anthranilates of mono-alkylated polyethylene glycols, e.g. anthranilates of Pluriol A500E® or of Pluriol A350E®, with SMA resins. This reaction does not lead to quantitative conversion of the maleic anhydride derived units of the SMA resins with the anthranilate amino groups, and the comb polymers do therefore contain a significant amount of unreacted cyclic anhydride units. A further conversion of these comb polymers with water, with specific amino alcohols, or with specific diamines is performed in order to obtain fully satisfying dispersant agents.

Hence, there is a need to provide further polymers which are readily accessible and can be used as dispersing agents.

Thus, it was an object of the presently claimed invention to provide novel polymers that can be used as dispersing agents which upon use in let-down paints impart favorable properties to the let-down paints such as low millbase viscosity, high gloss and stability.

SUMMARY OF THE INVENTION

It was surprisingly found that the polymerization of specific novel unsaturated compounds of formula (I) as defined below provides direct access to favorable dispersant agents which upon use lead to millbases having satisfactory rheological properties and let-down paints having high gloss and stability.

Therefore, an aspect of the presently claimed invention relates to a compound of formula (I)

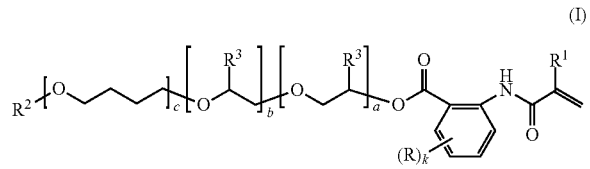

wherein
each R is independently selected from the group consisting of halogen, OH, $NO_2$, $C_1$-$C_4$-alkyl, $C_1$-$C_4$-alkoxy, $CONH_2$, NH—CHO, NH—$C_1$-$C_4$-alkyl, and NH—(C=O)—$C_1$-$C_4$-alkyl, and k is 0, 1, 2, 3 or 4, $R^1$ is selected from the group consisting of hydrogen and $C_1$-$C_4$-alkyl.

$R^2$ is selected from the group consisting of hydrogen and $C_1$-$C_{40}$-hydrocarbyl;

each $R^3$ is independently selected from the group consisting of hydrogen and $C_1$-$C_2$-alkyl;

a is from 0 to 1500;

b is from 0 to 1500; and c is from 0 to 750, where the sum of a+b+c is from 2 to 1500;

where the "a" repeating units [—O—$CH_2$—CH($R^3$)—], the "b" repeating units [—O—CH($R^3$)—$CH_2$—] and the "c" repeating units [—O—$CH_2CH_2CH_2CH_2$—] are distributed statistically or form a gradient or a block structure.

DETAILED DESCRIPTION OF INVENTION

Here and in the following, generic terms, such as alkyl, cycloalkyl, alkylene or halogen are used for the variables defining the formula I. These variables have to be understood as a list of individual radicals which are representatives of the generic term.

In this context, the term $C_n$-$C_m$ indicates the possible number of carbon atoms which the individual members of the generic terms may have.

In this context, the term "halogen" has to be understood as a halogen radical which is generally selected from fluorine, chlorine, bromine or iodine, in particular from fluorine or chlorine.

The term "hydrocarbyl" as used herein denotes an organic radical consisting entirely of hydrogen and carbon and includes alkyl, alkenyl, alkynyl, cycloalkyl and aryl radicals as well as mixed forms, such as groups containing both cycloalkyl and alkyl groups or groups containing both aryl and alkyl groups. $C_1$-$C_{40}$-Hydrocarbyl is an organic radical consisting entirely of hydrogen and carbon, as defined above, and containing 1 to 40 carbon atoms. Preferably, $C_1$-$C_{40}$-hydrocarbyl is $C_1$-$C_{40}$-alkyl.

The term "alkyl" as used herein and the alkyl parts of —NH($C_1$-$C_6$ alkyl) and —N($C_1$-$C_6$ alkyl)$_2$ in each case denote an aliphatic saturated hydrocarbon radical which may be linear or branched. If not specified otherwise, "alkyl" generally has from 1 to 6 carbon atoms ($C_1$-$C_6$ alkyl) and which preferably has from 1 to 4 carbon atoms ($C_1$-$C_4$ alkyl). Examples of $C_1$-$C_2$-alkyl are methyl and ethyl. Examples of $C_1$-$C_4$-alkyl are, in addition to those mentioned for $C_1$-$C_2$-alkyl, n-propyl, isopropyl, n-butyl, 2-butyl (sec-butyl), isobutyl and tert-butyl. Examples for $C_1$-$C_6$-alkyl are, in addition to those mentioned for $C_1$-$C_4$-alkyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl. Examples for $C_1$-$C_{18}$-alkyl are, in addition to those mentioned for $C_1$-$C_6$-alkyl, n-heptyl, 1-methylhexyl, 2-methylhexyl, 3-methylhexyl, 4-methylhexyl, 5-methylhexyl, 1-ethyl pentyl, 2-ethyl pentyl, 3-ethylpentyl, n-octyl, 1-methyloctyl, 2-methylheptyl, 1-ethylhexyl, 2-ethylhexyl, 1,2-dimethylhexyl, 1-propylpentyl, 2-propylpentyl, nonyl, decyl, 2-propylheptyl, 3-propylheptyl, linear undecyl and its branched isomers, lauryl and its branched isomers, linear tridecyl and its branched isomers, myristyl and its branched isomers, palmityl and its branched isomers, and stearyl and its branched isomers. Examples for $C_1$-$C_{20}$-alkyl are, in addition to those mentioned for $C_1$-$C_{18}$-alkyl, linear nonadecyl and its branched isomers and eicosenyl and its branched isomers. Examples for $C_1$-$C_{24}$-alkyl are, in addition to those mentioned for $C_1$-$C_{20}$-alkyl, linear henicosyl and its branched isomers, linear docosyl and its branched isomers, linear tricosyl and its branched isomers, and linear tetracosyl and its branched isomers. Examples for $C_1$-$C_{40}$-alkyl are, in addition to those mentioned for $C_1$-$C_{24}$-alkyl, the linear or branched higher homologs thereof with 25 to 40 carbon atoms.

The term "alkylene" (or alkanediyl) as used herein in each case denotes an alkyl radical as defined above, wherein one hydrogen atom at any position of the carbon backbone is replaced by one further binding site, thus forming a bivalent moiety. If not stated otherwise, preferred alkylene has 2 to 6 carbon atoms, in particular 2 to 4 carbon atoms. Preferably, the two binding sites of the bivalent moiety $C_2$-$C_6$ alkylene or $C_2$-$C_4$ alkylene, respectively, are not at the same carbon atom. Examples of $C_2$-$C_4$ alkylene include 1,2-ethandiyl (=$CH_2CH_2$), 1,2-propandiyl (=CH($CH_3$)$CH_2$), 1,3-propandiyl (=$CH_2CH_2CH_2$), 1-methyl-1,3-propandiyl (=CH($CH_3$)$CH_2CH_2$), 2-methyl-1,3-propandiyl (=$CH_2$CH($CH_3$)$CH_2$), 1-methyl-1,2-propandiyl (=C($CH_3$)$_2CH_2$), 1,4-butandiyl (=$CH_2CH_2CH_2CH_2$) and the like. Examples of $C_2$-$C_6$ alkylene include, in addition to those mentioned for $C_2$-$C_4$ alkylene, 1,5-pentandiyl (=$CH_2CH_2CH_2CH_2CH_2$), 2,2-dimethyl-1,3-propandiyl (=$CH_2$C($CH_3$)$_2CH_2$), 1,6-hexanediyl(=$CH_2CH_2CH_2CH_2CH_2CH_2$), etc. Examples of $C_1$-$C_4$ alkylene include, in addition to those mentioned for $C_2$-$C_4$ alkylene, methylene ($CH_2$).

The term "cycloalkyl" as used herein denotes in each case a mono- or bicyclic cycloaliphatic radical having usually from 3 to 10 carbon atoms ("$C_3$-$C_{10}$-cycloalkyl"), preferably 3 to 8 carbon atoms ("$C_3$-$C_8$-cycloalkyl") or in particular 3 to 6 carbon atoms ("$C_3$-$C_6$-cycloalkyl"). Examples of monocyclic radicals having 3 to 6 carbon atoms comprise cyclopropyl, cyclobutyl, cyclopentyl and cyclohexyl. Examples of monocyclic radicals having 3 to 8 carbon atoms comprise cyclopropyl, cyclobutyl, cyclopentyl, cyclohexyl, cycloheptyl and cyclooctyl. Examples of bicyclic radicals having 7 or 8 carbon atoms comprise bicyclo[2.1.1]hexyl, bicyclo[2.2.1]heptyl, bicyclo[3.1.1]heptyl, bicyclo[2.2.1]heptyl, bicyclo[2.2.2]octyl and bicyclo[3.2.1]octyl.

The term "alkoxy" as used herein denotes in each case a straight-chain or branched alkyl group usually having from 1 to 4 carbon atoms ("$C_1$-$C_4$-alkoxy") which is bound to the remainder of the molecule via an oxygen atom. $C_1$-$C_2$-Alkoxy is methoxy or ethoxy. $C_1$-$C_4$-Alkoxy is additionally, for example, n-propoxy, 1-methylethoxy (isopropoxy), butoxy, 1-methylpropoxy (sec-butoxy), 2-methylpropoxy (isobutoxy) or 1,1-dimethylethoxy (tert-butoxy).

The term "aryl" as used herein (and the aryl moiety in aryl-$C_1$-$C_4$-alkyl and $C_7$-$C_{40}$-arylalkyl) in each case denotes a mono-, bi- or tricyclic hydrocarbon radical comprising at least one phenyl ring, to which one or two further saturated or unsaturated 5- or 6-membered hydrocarbon rings may be fused. Generally aryl has 6 to 18 carbon atoms ("$C_6$-$C_{18}$-aryl"). Examples of aryl include phenyl, naphthyl, indanyl, indenyl, 1,2,3,4-tetrahydro-5-naphthyl, 1,2,3,4-tetrahydro-6-naphthyl, anthracenyl, 9,10-dihydroanthracen-1-yl and 9,10-dihydroanthracen-2-yl.

The term "aryl-$C_1$-$C_4$-alkyl" denotes an aryl radical as defined herein which is bound to the remainder via a $C_1$-$C_4$-alkylene moiety as defined herein. Examples are benzyl, 1-phenylethyl, 2-phenylethyl, 1-phenylpropyl, 2-phenylpropyl, 3-phenylpropyl, 1-phenylbutyl, 2-phenylbutyl, 3-phenylbutyl, 4-phenylbutyl, 2-methyl-1-phenylpropyl and the like.

The term "$C_7$-$C_{40}$-arylalkyl" denotes an aryl radical, as defined above which is bound to the remainder of the molecule via an alkylene moiety as defined above and/or carries one or more alkyl radicals, as defined therein, so that the overall number of carbon atoms is from 7 to 40. Examples are benzyl, 1-phenylethyl, 2-phenylethyl, 1-phenylpropyl, 2-phenylpropyl, 3-phenylpropyl, 1-phenylbutyl, 2-phenylbutyl, 3-phenylbutyl, 4-phenylbutyl, 2-methyl-1-phenylpropyl, 2-methylphenyl, 3-methylphenyl, 4-methylphenyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 2-methylbenzyl, 3-methylbenzyl, 4-methylbenzyl and the like.

The term "(meth)acrylates" as used herein refers to both the esters of acrylic acid and to the esters of methacrylic acid.

Although THF is not an alkyleneoxide in the proper sense, the term "polyalkyleneoxide" as used herein nevertheless includes polymers or polymer radicals containing repeating units derived from THF, such as [—O—$CH_2CH_2CH_2CH_2$—].

The remarks made below as to preferred embodiments of the different aspects of the presently claimed invention and in particular as to the variables (substituents) of the moieties of formulae I, II, II-H and III to VII are valid on their own as well as preferably in combination with each other. It is clear to a skilled person that for k being 2, 3 or 4, each substituent radical R may be identical or different.

In a preferred embodiment of the presently claimed invention, c is 0. Thus, the polyalkyleneoxide moiety as present in the compound of formula (I), depicted as formula (II)

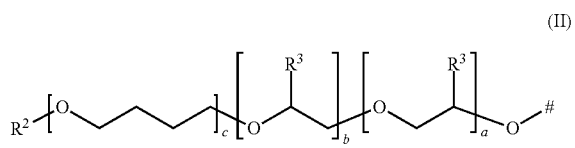

is preferably selected from the group consisting of poly (ethylene oxide) radicals (c is 0; $R^3$ is H), poly(propylene oxide) radicals (c is 0; $R^3$ is methyl) and poly(ethylene oxide-co-propylene oxide) radicals (c is 0; $R^3$ is H in a part of the repeating units and is methyl in the remaining repeating units), whereby in the poly(ethylene oxide-co-propylene oxide) radicals the ethylene oxide and propylene oxide repeating units may be arranged randomly or block-wise.

$R^2$ is preferably a $C_1$-$C_{40}$ hydrocarbyl radical. More preferably, $R^2$ is selected from the group consisting of $C_1$-$C_{24}$ alkyl, $C_6$-$C_{18}$ aryl, and $C_7$-$C_{40}$ arylalkyl. $R^2$ is even more preferably a $C_1$-$C_{18}$-alkyl radical, particularly preferably a $C_1$-$C_6$-alkyl radical, in particular an ethyl or methyl radical, most preferably a methyl radical.

Polyalkyleneoxide moieties (II) are also present in the repeating units of formula (IV) (see below); the above remarks apply there, too.

The polyalkyleneoxide moiety of formula (II) as present in compounds of formula (I) and in repeating units of formula (IV) is derived from polyalkyleneoxides of formula (II-H) used in step i) of the method for preparing the compound of formula (I) (see below). The polyalkyleneoxide (II-H) is either a diol (dialcohol), i.e. a compound carrying two terminal OH groups ($R^2$=H), or is a monoalcohol-monoether, i.e. a compound carrying one terminal OH group, while the other terminal OH-group is end-capped ($R^2$ is $C_1$-$C_{40}$-hydrocarbyl) as described above for the polyalkyleneoxide moiety (II). The polyalkyleneoxide moiety (II) as present in formulae (I) and (IV) differs from the polyalkyleneoxide (II-H) only in that it lacks a hydrogen atom. The remarks made about the polyalkyleneoxide moiety (II) and in particular about particular embodiments of this moiety are valid also for the polyalkyleneoxides (II-H).

With regard to the capability of the polymer to act as a dispersant, in particular as a dispersant for pigments and fillers, preference is given to polyalkyleneoxide moieties (II) in formulae (I) and (IV) which are derived from polyalkyleneoxides (II-H) having a number average molecular weight $M_n$ in the range from 200 to 50000 Dalton, more preferably from 300 to 20000 Dalton, most preferably from 400 to 10000 Dalton. The weight average molecular weight $M_w$ of the polyalkyleneoxides (II-H) from which the polyalkyleneoxide moieties (II) are derived is preferably in the range from 210 to 200000 Dalton, more preferably from 330 to 50000 Dalton, most preferably from 500 to 20000 Dalton. The polydispersity $M_w/M_n$ is preferably in the range from 1.05 to 4, more preferably from 1.1 to 3 and most preferably from 1.2 to 2.

Preferably, in the polyalkyleneoxide moiety (II) in formulae (I) and (IV), a+b+c is preferably from 2 to 500, more preferably from 3 to 250, and even more preferably from 5 to 100.

In formulae (I) and (IV), the variables R, $R^1$, $R^2$, $R^3$, k, a, b and c, alone or in combination preferably have the following meanings:

k is 0, 1 or 2 0;

each R if present, is independently selected from the group consisting of Cl, F, OH, $NO_2$, $CH_3$, $C_2H_5$, O—$CH_3$, O—$C_2H_5$, $CONH_2$, NH—CHO, NH—$C_1$-$C_4$-alkyl, and NH—(C=O)—$C_1$-$C_4$-alkyl;

$R^1$ is selected from the group consisting of hydrogen, methyl, ethyl, 1-propyl, 2-propyl, 1-butyl, 2-butyl, and tert-butyl;

$R^2$ is $C_1$-$C_{40}$ hydrocarbyl, preferably selected from the group consisting of $C_1$-$C_{24}$ alkyl, $C_6$-$C_{18}$ aryl, and $C_7$-$C_{40}$ arylalkyl; and a+b+c is 2 to 500.

More preferably, in formulae (I) and (IV), the variables R, $R^1$, $R^2$, $R^3$, k, a, b and c, alone or in combination have the following meanings:

k is 0 or 1;

each R if present, is independently selected from the group consisting of Cl, F, OH, $NO_2$, $CH_3$, $C_2H_5$, O—$CH_3$, O—C$_2$H$_5$, CONH$_2$, NH—CHO, NH—C$_1$-C$_4$-alkyl, and NH—(C═O)—C$_1$-C$_4$-alkyl;

R$^1$ is selected from the group consisting of hydrogen and methyl;

R$^2$ is C$_1$-C$_{18}$-alkyl;

R$^2$ is H or methyl, preferably H; and a+b+c is from 3 to 250.

Even more preferably, in formulae (I) and (IV), the variables R, R$^1$, R$^2$, R$^3$, k, a, b and c, alone or in combination have the following meanings:

k is 0;

R$^1$ is selected from the group consisting of hydrogen and methyl;

R$^2$ is C$_1$-C$_6$-alkyl, preferably ethyl or methyl, more preferably methyl;

R$^2$ is H or methyl, preferably H; and a+b+c is from 5 to 100.

Another aspect of the presently claimed invention relates to a method for preparing the compound of formula (I) comprising i) reacting a polyalkyleneoxide of formula (II-H)

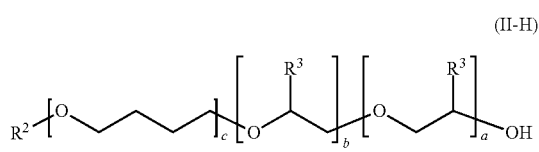

(II-H)

wherein R$^2$, R$^3$, a, b and c are as defined above, with an unsubstituted or substituted isatoic anhydride or an ester-forming derivative of unsubstituted or substituted anthranilic acid, wherein the substituted isatoic anhydride and substituted anthranilic acid are substituted with k substituents R on the phenyl ring, and ii) reacting the product thereof with a compound of the formula (III)

CH$_2$═C(R$^1$)—C(O)—X    (III)

wherein R$^1$ is as defined in formula (I) as given above and X is selected from the group consisting of halogen, C$_1$-C$_4$-alkoxy and CH$_2$═C(R$^1$)—C(O)—.

The compounds of formula (I) can be efficiently prepared by the two-step process defined above.

In step i), a polyalkyleneoxide is reacted with an unsubstituted or substituted isatoic anhydride or an ester forming derivative of unsubstituted or substituted anthranilic acid, wherein the substituted isatoic anhydride and substituted anthranilic acid are substituted with k substituents R on the phenyl ring. The variables k and R are as defined herein.

Such unsubstituted or substituted isatoic anhydrides or ester forming derivatives of unsubstituted or substituted anthranilic acid are shown in formulae V, VI or VII:

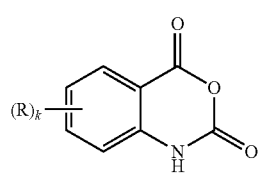

(V)

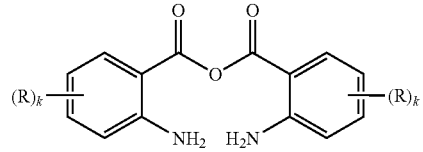

(VI)

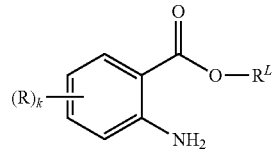

(VII)

wherein k and R are as defined herein and wherein R$^L$ is C$_1$-C$_4$-alkyl.

Examples of suitable compounds of the formula V are isatoic anhydride, fluoroisatoic anhydride, chloroisatoic anhydride, bromoisatoic anhydride, nitroisatoic anhydride, hydroxyisatoic anhydride, methoxyisatoic anhydride. An example of a suitable compounds of the formula VI is the anhydride of anthranilic acid, i.e. k=0.

In particular embodiments of the method, the polyC$_2$-C$_4$-alkyleneoxide (II-H) is a poly(ethylene oxide), a poly(propylene oxide) or a poly(ethylene oxide-co-propylene oxide), wherein in the latter the ethylene oxide and propylene oxide repeating units may be arranged randomly or blockwise. It has at least one terminal OH group which is capable of reacting with the unsubstituted or substituted isatoic anhydride or an ester forming derivative of unsubstituted or substituted anthranilic acid. The at least one other terminal group may be a OH group (R$^2$═H) or may it be end-capped (R$^2$ different from H). Preferably, R$^2$ in the polyalkyleneoxide (II-H) is a C$_1$-C$_{40}$ hydrocarbyl radical. More preferably, R$^2$ is selected from the group consisting of C$_1$-C$_{24}$ alkyl, C$_6$-C$_{18}$ aryl, and C$_7$-C$_{40}$ arylalkyl. R$^2$ is even more preferably a C$_1$-C$_{18}$-alkyl radical, particularly preferably a C$_1$-C$_6$-alkyl radical, in particular an ethyl or methyl radical, most preferably a methyl radical. The polyalkyleneoxide (II-H) used in step i) of the method for preparing the compound of formula I provides the polyalkyleneoxide moiety (II) as present in formulae (I) and (IV). The polyalkyleneoxide moiety as present in formulae (I) and (IV) differs from the polyalkyleneoxide (II-H) only in that it lacks a hydrogen atom. The remarks made about the polyalkyleneoxide and in particular about particular embodiments of this molecule are valid also for the polyalkyleneoxide moiety. The molecular weight of the polyalkyleneoxide corresponds to the molecular weight of the polyalkyleneoxide moiety (II).

The polyalkyleneoxides (II-H) are commercially available, e.g. the Carbowax® grades from Dow, from Huntsman, the Pluriol® grades from BASF SE, the Pluronic® grades from BASF SE and the Lutensol® grades from BASF SE.

Step i) is generally performed at temperatures ranging from 40 to 180° C., preferably from 60 to 140° C.

Step i) may be performed in bulk or in solvent.

At typical reaction temperatures, many polyalkyleneoxides (II-H) are liquid and capable of dissolving at least part of the isatoic anhydride (as of formula V) or of the ester forming derivative of anthranilic acid (as of formula VI). Step i) can therefore be carried out without adding a solvent. Preferably, the reaction is performed in bulk, i.e. the concentration of the reactants is at least 90% by weight, based on the weight of the reaction mixture.

Alternatively, step i) may be carried out in the presence of solvent. Suitable solvents are those which are inert under reaction conditions, examples including esters, hydrocarbons and mixtures thereof. A preferable solvent increases the solubility of the isatoic anhydride (as of formula V) or of the ester forming derivative of anthranilic acid (as of formula VI) in the reaction medium.

Step i) is generally performed in the presence of a suitable catalyst which promotes the reaction of the hydroxyl group(s) of the polyalkyleneoxide (II-H) with the carbonyl groups in V or VI. Suitable catalysts include alkalimetal hydroxides, such as sodium or potassium hydroxide, alkalimetal carbonates, such as sodium or potassium carbonate, tertiary amines, e.g. tri-$C_1$-$C_6$-alkylamines, such as triethylamine, tripropylamine, tributylamine, dimethylpropylamine, dimethylbutylamine, dimethyl-isopropylamine, di-$C_1$-$C_6$-alkyl-$C_5$-$C_6$-cycloalkylamines, such as dimethylcyclohexylamine, di-$C_1$-$C_6$-alkylpyridines, such as 4-dimethylaminopyridine, cyclic amines comprising at least one tertiary nitrogen atom and 5 to 15 carbon atoms, such as 1,5-Diazabicyclo[4.3.0]non-5-en (DBN), 1,8-Diazabicyclo[5.4.0]undec-7-en (DBU), or triethylenediamine (DABCO), tin compound catalysts, such as dibutyltindioctoate and dibutyltindilaurate.

The amount of catalyst used in step i) is generally from 0.01 to 2% by weight, in particular from 0.1 to 1% by weight, based on the total amount of polyalkyleneoxide (II-H) and the compound of formulae (V), (VI) or (VII).

In the reaction of step ii), the amino group of the anthranilic ester [which is obtained in step i)] is amidated. This amidation provides the compound of formula I and a volatile by-product HX, wherein X is selected from the group consisting of halogen, $C_1$-$C_4$-alkoxy and $CH_2$=$C(R^1)$—C(O)—. The reaction of step ii) can be promoted, e.g., accelerated or driven to higher yield, very easily, by removing the volatile by-product from the reaction mixture. A further advantage of step ii) is that it results in a relatively uniform amide reaction product, i.e. in the compound of formula I.

It is thus preferable to remove the by-product HX formed in step ii) from the reaction medium. HX can be removed continuously or stepwise during step ii). HX is preferably removed continuously. HX can, for example, be removed from the reaction medium by evaporation of HX, e.g. by continuous evaporation of HX. Preferably, HX is distilled off while step ii) is carried out.

In step ii), the product of step i) is reacted with a compound of the formula (III)

$$CH_2=C(R^1)—C(O)—X \quad (III)$$

wherein $R^1$ is as defined for formula (I) and X is selected from the group consisting of halogen, $C_1$-$C_4$-alkoxy and $CH_2$=$C(R^1)$—C(O)—.

In formula (III), the variables $R^1$ and X alone or in combination have preferably the following meanings:
$R^1$ is selected from the group consisting of hydrogen and methyl, and is preferably methyl;
X is selected from methoxy, ethoxy, 1-propoxy, 2-propoxy, and $CH_2$=$C(R^1)$—C(O)—, especially $CH_2$=$C(R^1)$—C(O)—.

Preferably, the compound of formula (III) is selected from the group consisting of acrylic anhydride and methacrylic anhydride. In a particularly preferred embodiment, the compound of formula (III) is methacrylic anhydride.

Step ii) is generally performed at temperatures ranging from 20 to 120° C., preferably from 50 to 110° C.

Step ii) may be performed in bulk or in solvent.

At typical reaction temperatures, the product obtained from step i) is liquid and capable of dissolving at least part of the compound of formula (II). Step ii) can therefore be carried out without adding a solvent. Preferably, the reaction is performed in bulk, i.e. the concentration of the reactants is at least 90% by weight, based on the weight of the reaction mixture.

Alternatively, step ii) may be carried out in the presence of solvent. Suitable solvents are those which are inert under the reaction conditions, examples including amides, hydrocarbons and mixtures thereof. A preferable solvent increases the solubility of the compound of formula II in the reaction medium.

In a particularly preferred embodiment of the method for preparing the compound of formula I, the unsubstituted or substituted isatoic anhydride (preferably the unsubstituted isatoic anhydride) is used in step i) and both steps, i.e. step i) and step ii), are performed in bulk and the crude reaction product of step i) is fed into step ii) without any intermediate purification of the reaction product of step i).

Another aspect of the presently claimed invention relates to a polymer having a C—C— backbone, which comprises repeating units of formula (IV),

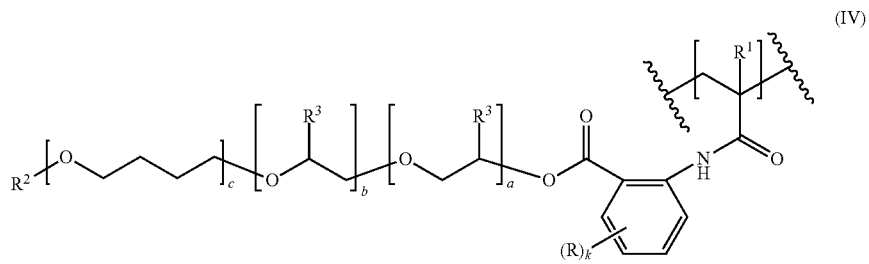

(IV)

wherein R, $R^1$, $R^2$, $R^3$, k, a, b and c are defined as given above, and wherein in the polymer at most 90%, preferably at most 70%, more preferably at most 50% of the $R^1$ substituted backbone carbon atoms are bound to a backbone carbon atom bearing a COOH group.

The polymers according to the presently claimed invention comprising repeating units of the formula (IV) are obtainable by polymerization of monomers M, comprising at least one monomer of formula (I) as defined herein. Therefore, another aspect of the presently claimed invention relates to a polymer, obtainable by polymerization of monomers M, comprising at least one monomer of formula (I) as defined herein.

The polymers according to the presently claimed invention are obtainable by polymerization of monomers M, comprising at least one monomer of formula (I), i.e. compound of formula (I), as specified above. The monomers M in addition to the monomer compound of the formula (I) may comprise one or more comonomers M2 selected from ethylenically unsaturated compounds different from the compounds of formula (I).

Suitable comonomers M2 include, for example:

vinylaromatic hydrocarbons, such as styrene and $C_1$-$C_4$-alkyl substituted styrene, such as vinyltoluene, p-tert-butylstyrene and α-methyl styrene;

monoethylenically unsaturated mono- and dicarboxylic acids, in particular those having 3 to 6 carbon atoms, such as acrylic acid, methacrylic acid, maleic acid, fumaric acid, itaconic acid and vinylacetic acid, 2-acryloxyethyl acetic acid and 2-methacryloxyethyl acetic acid;

primary amides of monoethylenically unsaturated carboxylic acids, in particular of monoethylenically unsaturated $C_3$-$C_6$-monocarboxylic acids, such as acrylamide and methacrylamide;

N-mono-$C_1$-$C_{20}$-alkyl amides of monoethylenically unsaturated carboxylic acids, in particular N-mono-$C_1$-$C_{20}$-alkyl amides of monoethylenically unsaturated $C_3$-$C_6$-monocarboxylic acids, especially of acrylic acid or of methacrylic acid, such as N-methyl acrylamide, N-ethyl acrylamide, N-propyl acrylamide, N-isopropyl acrylamide, N-methyl methacrylamide, N-ethyl methacrylamide, N-propyl methacrylamide, N-isopropyl methacrylamide;

N,N-di-$C_1$-$C_{20}$-alkyl amides of monoethylenically unsaturated carboxylic acids, in particular N,N-di-$C_1$-$C_{20}$-alkyl amides of monoethylenically unsaturated $C_3$-$C_6$-monocarboxylic acids, especially of acrylic acid or of methacrylic acid, such as N,N-dimethyl acrylamide, N,N-diethyl acrylamide, N,N-dimethyl methacrylamide, and N,N-diethyl methacrylamide;

$C_1$-$C_{20}$-alkyl esters of monoethylenically unsaturated carboxylic acids, e.g., $C_1$-$C_{20}$-alkyl esters of monoethylenically unsaturated $C_3$-$C_6$-monocarboxylic acids, in particular $C_1$-$C_{20}$-alkyl esters of acrylic acid and $C_1$-$C_{20}$-alkyl esters of methacrylic acid, such as methyl acrylate, ethyl acrylate, n-propylacrylate, n-butyl acrylate, iso-butyl acrylate, tert-butyl acrylate, methyl methacrylate, ethyl methacrylate, propyl methacrylate, iso-butyl methacrylate, n-butyl methacrylate, tert.-butyl methacrylate, hexyl acrylate, hexyl methacrylate, octyl acrylate, octyl methacrylate, 2-ethylhexyl acrylate, 2-ethylhexyl methacrylate, decyl acrylate, decyl methacrylate, 2-propylheptyl acrylate, 2-propylheptyl methacrylate, $C_3$-$C_{10}$-cycloalkyl esters of monoethylenically unsaturated carboxylic acids, e.g., $C_3$-$C_{10}$-cycloalkyl esters of acrylic acid, isobornyl acrylate, isobornyl methacrylate, cyclohexyl acrylate or cyclohexyl methacrylate;

(di-$C_1$-$C_{20}$-alkylamino-$C_2$-$C_4$-alkyl) esters of monoethylenically unsaturated carboxylic acids, in particular (di-$C_1$-$C_{20}$-alkylamino-$C_2$-$C_4$-alkyl) esters of monoethylenically unsaturated $C_3$-$C_6$-monocarboxylic acids, especially of acrylic acid or of methacrylic acid, e.g., (di-$C_1$-$C_{20}$-alkylamino-$C_2$-$C_4$-alkyl) esters of acrylic acid or methacrylic acid, such as 2-(N,N-dimethylamino)ethyl acrylate, 2-(N,N-dimethylamino)ethyl methacrylate, 3-(N,N-dimethylamino)propyl acrylate and 3-(N,N-dimethylamino)propyl methacrylate;

(tri-$C_1$-$C_{20}$-alkylammonium-$C_2$-$C_4$-alkyl) esters of monoethylenically unsaturated carboxylic acids, in particular (tri-$C_1$-$C_{20}$-alkylammonium-$C_2$-$C_4$-alkyl) esters of monoethylenically unsaturated $C_3$-$C_6$-monocarboxylic acids, especially of acrylic acid or of methacrylic acid, e.g., (tri-$C_1$-$C_{20}$-alkylammonium-$C_2$-$C_4$-alkyl) esters of acrylic acid or methacrylic acid, such as 2-(N,N,N-trimethylammonium)ethyl acrylate, 2-(N,N,N-trimethylammonium)ethyl methacrylate, 3-(N,N,N-trimethyl-ammonium)propyl acrylate and 3-(N,N,N-trimethylammonium)propyl methacrylate, especially the halides, sulfates and methosulfates;

N-(tri-$C_1$-$C_{20}$-alkylammonium-$C_2$-$C_4$-alkyl) amides of monoethylenically unsaturated carboxylic acids, in particular (tri-$C_1$-$C_{20}$-alkylammonium-$C_2$-$C_4$-alkyl) amides of $C_3$-$C_6$-monocarboxylic acids, especially of acrylic acid or of methacrylic acid, such as N-[2-(N',N',N'-trimethylammonium)ethyl] acrylamide, N-[2-(N',N',N'-trimethyl-ammonium)ethyl] methacrylamide, N-[3-(N',N',N'-trimethylammonium)propyl] acrylamide and N-[3-(N',N',N'-trimethylammonium)propyl] methacrylamide, especially the halides, sulfates and methosulfates;

N-(di-$C_1$-$C_{20}$-alkylamino-$C_2$-$C_4$-alkyl) amides of monoethylenically unsaturated carboxylic acids, in particular (di-$C_1$-$C_{20}$-alkylamino-$C_2$-$C_4$-alkyl) amides of $C_3$-$C_6$-monocarboxylic acids, especially of acrylic acid or of methacrylic acid, such as N-[2-(N',N'-dimethylamino)ethyl] acrylamide, N-[2-(N',N'-dimethylamino)ethyl] methacrylamide, N-[3-(N',N'-dimethylamino)propyl] acrylamide, and N-[3-(N',N'-dimethylamino)propyl] methacrylamide;

vinyl substituteted heterocycles, e.g., monovinyl substituteted heterocycles wherein the heterocycle is a 5- to 8-membered ring of 2 to 7 carbon atoms, and 1 to 4 heteroatoms selected from N, O and S, such as vinylpyridines, N-vinylpyrrolidone, N-vinylmorpholin-2-one, N-vinyl carprolactam and 1-vinylimidazole; and morpholides of monoethylenically unsaturated carboxylic acids, in particular the morpholides of acrylic acid or methacrylic acid.

Suitable comonomers M2 include also the following groups:

hydroxy-$C_2$-$C_4$-alkyl esters of monoethylenically unsaturated carboxylic acids, in particular hydroxy-$C_2$-$C_4$-alkyl esters of $C_3$-$C_6$-monocarboxylic acids, especially hydroxy-$C_2$-$C_4$-alkyl esters of acrylic acid or methacrylic acid such as 2-hydroxyethyl acrylate, 2-hydroxyethyl methacrylate, 2- or 3-hydroxypropyl acrylate, 2- or 3-hydroxypropyl methacrylate, 4-hydroxybutyl acrylate and 4-hydroxybutyl methacrylate;

monoethylenically unsaturated $C_3$-$C_6$-mononitriles such as acrylonitrile, or methacrylonitrile;

esters of mono-$C_1$-$C_{10}$-alkyl-terminated poly-$C_2$-$C_4$-alkyleneglycols, in particular of mono-$C_1$-$C_{10}$-alkyl-terminated polyethyleneglycols, with monoethylenically unsaturated carboxylic acids, in particular with $C_3$-$C_6$-monocarboxylic acids, the esters of acrylic acid or methacrylic acid, such as methylpolyethylenglycol acrylate and methylpolyethyleneglycol methacrylate;

di-($C_1$-$C_{10}$-alkyl) esters of monoethylenically unsaturated $C_4$-$C_6$-dicarboxylic acids and di-($C_3$-$C_{10}$-cycloalkyl) esters of monoethylenically unsaturated $C_4$-$C_6$-dicarboxylic acids, in particular the di-($C_1$-$C_{10}$-alkyl) esters of itaconic acid and the di-($C_3$-$C_{10}$-cycloalkyl) esters of itaconic acid, such as the dimethyl ester, diethyl ester or dibutyl ester of itaconic acid;

$C_2$-$C_{18}$-olefins, e.g., $C_4$-$C_{18}$-olefins, such as 1-butene, isobutene, 1-hexene, 1-octene, 2-ethyl-1-hexene, diisobutene (2,4,4-trimethyl-1-pentene), triisobutene (2,4,4,6,6-pentamethyl-1-heptene), tetraisobutene, and oligoisobutenes having an average of 8 to 18 carbon atoms;

$C_1$-$C_{20}$-alkylvinyl ethers, such as ethylvinyl ether, butylvinyl ether hexylvinyl ether, octylvinyl ether, decylvinyl ether, dodecylvinyl ether, stearylvinyl ether; and vinyl esters of $C_1$-$C_{20}$-alkanoic acids, in particular vinyl acetate, vinyl propionate vinyl butyrate, vinyl stearate.

The comonomers M2 are in particular selected from the group consisting of vinylaromatic hydrocarbons, such as styrene and $C_1$-$C_4$-alkyl substituted styrene, such as vinyltoluene, p-tert-butylstyrene and α-methyl styrene;

monoethylenically unsaturated mono- and dicarboxylic acids, in particular those having 3 to 6 carbon atoms, such as acrylic acid, methacrylic acid, maleic acid, fumaric acid, itaconic acid and vinylacetic acid, 2-acryloxyethyl acetic acid and 2-methacryloxyethyl acetic acid;

primary amides of monoethylenically unsaturated carboxylic acids, such as acrylamide and methacrylamide;

N-mono-$C_1$-$C_{20}$-alkyl amides of monoethylenically unsaturated carboxylic acids, in particular N-mono-$C_1$-$C_{20}$-alkyl amides of acrylic acid or methacrylic acid, such as N-methyl acrylamide, N-ethyl acrylamide, N-propyl acrylamide, N-isopropyl acrylamide, N-methyl methacrylamide, N-ethyl methacrylamide, N-propyl methacrylamide, N-isopropyl methacrylamide;

N,N-di-$C_1$-$C_{20}$-alkyl amides of monoethylenically unsaturated carboxylic acids, in particular N,N-di-$C_1$-$C_{20}$-alkyl amides of acrylic acid or methacrylic acid, such as N,N-dimethyl acrylamide, N,N-diethyl acrylamide, N,N-dimethyl methacrylamide, and N,N-diethyl methacrylamide;

(di-$C_1$-$C_{20}$-alkylamino-$C_2$-$C_4$-alkyl) esters of monoethylenically unsaturated carboxylic acids, e.g., (di-$C_1$-$C_{20}$-alkylamino-$C_2$-$C_4$-alkyl) esters of acrylic acid or methacrylic acid, such as 2-(N,N-dimethylamino)ethyl acrylate, 2-(N,N-dimethyl-amino)ethyl methacrylate, 3-(N,N-dimethylamino)propyl acrylate and 3-(N,N-dimethylamino)propyl methacrylate;

(tri-$C_1$-$C_{20}$-alkylammonium-$C_2$-$C_4$-alkyl) esters of monoethylenically unsaturated carboxylic acids, e.g., (tri-$C_1$-$C_{20}$-alkylammonium-$C_2$-$C_4$-alkyl) esters of acrylic acid or methacrylic acid, such as 2-(N,N,N-trimethylammonium)ethyl acrylate, 2-(N,N,N-trimethylammonium)ethyl methacrylate, 3-(N,N,N-trimethylammonium)-propyl acrylate and 3-(N,N,N-trimethylammonium)propyl methacrylate, especially the halides, sulfates and methosulfates;

monovinyl substituteted heterocycles, wherein the heterocycle is a 5- to 8-membered ring of 2 to 7 carbon atoms, and 1 to 4 heteroatoms selected from N, O and S, such as vinylpyridines, N-vinylpyrrolidone, N-vinylmorpholin-2-one, N-vinyl carprolactam and 1-vinylimidazole; and morpholides of monoethylenically unsaturated carboxylic acids, in particular the morpholides of acrylic acid or methacrylic acid.

Especially, the comonomers M2 are selected from the group consisting of styrene, acrylic acid, methacrylic acid, fumaric acid, itaconic acid, maleic acid, 2-(N,N-dimethylamino)ethyl methacrylate, (2-(methacryloyloxy)ethyl)trimethyl ammonium chloride, 1-vinylimidazole, dimethylacrylamide, and N-acryloylmorpholine.

The amount of monomers M will generally be at least 0.5 mol-%, frequently at least 1 mol-% or at least 2 mol-%, in particular at least 5 mol-% and especially at least 10 mol-%, based on the total number of monomers M. The monomer of formula (I) may, for example, make up 100 mol-%, but will be frequently at most 99 mol-%, in particular at most 95 mol-%, more particularly at most 90 mol-% and especially at most 80 mol-% or at most 60 mol-%, based on the total number of monomers M. The amount of monomers M will e.g. be from 0.5 to 100 mol-% or from 0.5 to 99 mol-% or from 1 to 99 mol-%, in particular from 1 to 95 mol-% or from 2 to 95 mol-% or from 5 to 95 mol-% or from 2 to 90 mol-% or from 5 to 90 mol-% and especially from 10 to 90 mol-% or from 10 to 80 mol-%or from 10 to 60 mol-%, based on the total number of monomers M.

The amount of comonomers M2 will generally not exceed 99.5 mol-%, frequently not exceed 99 mol-%, in particular not exceed 95 mol-%, more particularly not exceed 90 mol-%-%, based on the total number of monomers M. If present, the amount of comonomers M2 will be, e.g. from 1 to 99.5 mol-% or from 1 to 99 mol-%, in particular from 5 to 99 mol-% or from 5 to 98 mol-% or from 5 to 95 mol-% or from 10 to 98 mol-% or from 10 to 95 mol-% and especially from 10 to 90 mol-% or from 20 to 90 mol-% or from 40 to 90 mol-%, based on the total number of monomers M.

A polymer according to the presently claimed invention has a C—C-backbone which comprises repeating units of formula (IV) as specified above. In the polymer, at most 90% of the $R^1$ substituted backbone carbon atoms are bound to a carbonyl substituted backbone carbon atom.

Besides the repeating units of formula (IV), the polymer of the presently claimed invention preferably comprises repeating units U which are different from the repeating units of formula (IV). It may comprise neutral and/or negatively charged repeating units, e.g. aromatic repeating units, such as styrene derived repeating units, carboxyl substituted repeating units, such as repeating units derived from acrylic acid or methacrylic acid [—($CH_2$—CH(COOH))—, —($CH_2$—C($CH_3$)(COOH))—], and/or positively charged repeating units, e.g. repeating units that include a trialkylammonium subunit, such as (2-(methacryloyloxy)ethyl)trimethyl ammonium chloride derived repeating units.

It is apparent that repeating units correspond to the monomers M2 and hence are hereinafter also termed repeating units $U_{M2}$ which are derived from the monoethylenically unsaturated monomers M2 as described above.

Preferably, the repeating units $U_{M2}$ are derived from at least one polymerized monoethylenically unsaturated monomer M2 selected from the group consisting of monovinylaromatic monomers, especially styrene;

monoethylenically unsaturated $C_3$-$C_6$-monocarboxylic acids, especially acrylic acid or methacrylic acid;

primary amides of monoethylenically unsaturated $C_3$-$C_6$-monocarboxylic acids, especially acryl amide or methacryl amide;

N-mono-$C_1$-$C_{20}$-alkyl amides of monoethylenically unsaturated $C_3$-$C_6$-monocarboxylic acids, especially monomethylacrylamide;

N,N-di-$C_1$-$C_{20}$-alkyl amides of monoethylenically unsaturated $C_3$-$C_6$-monocarboxylic acids, especially dimethylacrylamide;

(di-$C_1$-$C_{20}$-alkylamino-$C_2$-$C_4$-alkyl) esters of monoethylenically unsaturated $C_3$-$C_6$-monocarboxylic acids, especially 2-(N,N-dimethylamino)ethyl methacrylate;

(tri-$C_1$-$C_{20}$-alkylammonium-$C_2$-$C_4$-alkyl) esters of monoethylenically unsaturated $C_3$-$C_6$-monocarboxylic acids, such as (2-(methacryloyloxy)ethyl)trimethyl ammonium chloride;

N-(tri-$C_1$-$C_{20}$-alkylammonium-$C_2$-$C_4$-alkyl) amides of monoethylenically unsaturated $C_3$-$C_6$-monocarboxylic acids, especially;

N-(di-$C_1$-$C_{20}$-alkylamino-$C_2$-$C_4$-alkyl) amides of monoethylenically unsaturated $C_3$-$C_6$-monocarboxylic acids;

monovinyl substituteted heterocycles, wherein the heterocycle is a 5- or 6-membered aromatic ring of 2 to 5 carbon atoms, and 1 to 4 heteroatoms selected from N, O and S, especially 1-vinylimidazole; and N-(meth)acryloylmorpholine, especially N-acryloylmorpholine;

and mixtures of these monomers.

Most preferably, the repeating units $U_{M2}$ are derived from at least one polymerized monoethylenically unsaturated monomer M2 selected from the group consisting of monovinylaromatic monomers, especially styrene;

monoethylenically unsaturated carboxylic acids, e.g., monoethylenically unsaturated $C_3$-$C_6$-monocarboxylic acids, such as acrylic acid or methacrylic acid;

(tri-$C_1$-$C_{20}$-alkylammonium-$C_2$-$C_4$-alkyl) esters of monoethylenically unsaturated $C_3$-$C_6$-monocarboxylic acids, such as (2-(methacryloyloxy)ethyl)trimethyl ammonium chloride;

and mixtures of these monomers.

The amount of unsubstituted backbone carbon atoms, i.e. methylene (—$CH_2$—) backbone carbon atoms may, for example, be at least 35 mol-%, will be frequently at least 38 mol-%, in particular at least 41 mol-%, more particularly at least 45 mol-% and at most 75 mol-%, will be frequently at most 65 mol-%, in particular at most 60 mol-%, more particularly at most 55 mol-%, e.g. from 35 to 75 mol-% or from 38 to 65 mol-% or from 41 to 60 mol-%, in particular from 45 to 55 mol-%, based on all backbone carbon atoms of the C—C-backbone of the polymer of the presently claimed invention.

According to the presently claimed invention, in the polymer not more than 90%, preferably not more than 85%, more preferably not more than 80%, even more preferably not more than 60% of the $R^1$ substituted backbone carbon atoms are bound to a carboxyl substituted backbone carbon atom. The expression "$R^1$ substituted backbone carbon atom" refers to backbone carbon atoms that are bound to $R^1$, irrespective of whether $R^1$ is H or $C_1$-$C_4$-alkyl. It is understood from formulae (I) and (IV) that each "$R^1$ substituted backbone carbon atom" is also bound to the carbonyl carbon of the amide group shown in these formulae, i.e. to the carbonyl carbon atom of the amide group by which each anthranilate group is attached to the C—C-backbone. Both neighboring backbone carbon atoms are considered for determining whether a specific "$R^1$ substituted backbone carbon atom" is bound to a carboxyl substituted backbone carbon atom or not.

This upper limit of neighboring carboxyl substituted backbone carbon atoms is not met by SMA resin derived polymers of the prior art. When an anthranilate residue is attached to one of the carboxyl carbon atoms of a maleic anhydride derived subunit, there is always a neighboring carbonyl substituted backbone carbon atom originating from the same maleic anhydride derived subunit. This means that 100% of the anthranilate substituted backbone carbon atoms are bound to a carboxyl substituted backbone carbon atom in such SMA resin derived polymers.

In many polymers of the prior art, neighbouring backbone carbon atoms are not only connected directly, via the covalent C—C bonds of the backbone, but also indirectly through bridging residues. SMA derived polymers, for example, do often contain remaining unreacted five membered anhydride or imide rings which bridge neighboring backbone carbon atoms.

In one embodiment of the polymer of the presently claimed invention, the amount of bridged carbon atoms of the C—C-backbone is preferably small. The amount of bridged carbon atoms of the C—C-backbone may, for example, be at most 10 mol-%, preferably at most 5 mol-%, more preferably at most 2.5 mol-%, even more preferably at most 1 mol-%, and in particular at most 0.5 mol-% based on all backbone carbon atoms of the C—C-backbone of the polymer of the presently claimed invention. This ensures more flexible C—C-backbones which adapt to the surface of dispersed particles more efficiently.

With regard to their capability of acting as a dispersant, in particular as a dispersant for pigments and fillers, preference is given to polymers according to the presently claimed invention which have a number average molecular weight $M_n$ in the range from 1000 to 200000 Dalton, more preferably from 1500 to 150000 Dalton, even more preferably from 1800 to 100000 Dalton. The weight average molecular weight $M_w$ of the polymers is generally in the range from 1100 to 1000000 Dalton, preferably from 1700 to 600000 Dalton, more preferably from 2000 to 300000 Dalton. The polydispersity $M_w/M_n$ is generally in the range from 1.05 to 5, preferably from 1.1 to 4 and more preferably from 1.2 to 3.

Another aspect of the presently claimed invention relates to a method for preparing the polymer of the presently claimed invention, which comprises a free radical polymerization of ethylenically unsaturated monomers M comprising at least one compound of formula I as defined above.

The free-radically initiated polymerization is typically carried out in the presence of a polymerization initiator or a polymerization initiator system. Possible free-radical polymerization initiators are, in particular, initiators and initiator systems which form free radicals on decomposition. These include, in particular:

peroxo compounds, for example alkali metal or ammonium peroxodisulfates, diacetylperoxide, dibenzoyl peroxide, succinyl peroxide, di-tert-butyl peroxide, tert-butyl perbenzoate, tert-butyl perpivalate, tert-butyl peroxy-2-ethylhexanoate, tert-butyl permaleate, cumene hydroperoxide, diisopropyl peroxydicarbamate, tert-butyl perisobutyrate, tert-butyl peracetate, di-tert-amyl peroxide, tert-butyl hydroperoxide, azo compounds, such as 2,2'-azobisisobutyronitrile, azobis(2-amidinopropane) dihydrochloride, azobis(2,4-dimethylvaleronitrile) or 2,2'-azobis(2-methyl-butyronitrile);

initiator mixtures or redox initiator systems, such as ascorbic acid/iron(II) sulfate/sodium peroxodisulfate, tert-butyl hydroperoxide/sodium disulfite, tert-butyl hydroperoxide/sodium hydroxymethanesulfinate, $H_2O_2/Cu^I$.

The amount of polymerization initiator which is used for preparing the polymer is typically in the range from 0.2 to 5% by weight, in particular in the range from 0.3 to 3% by weight, based on the total amount of monomers M to be polymerized. Optionally, it is advantageous to add the polymerization initiator during the polymerization over a prolonged period of time, for example in parallel with the addition of the monomers of formula (I) and optionally comonomers M2. The addition can be carried out at a continuous inflow rate or with an increasing or decreasing inflow rate.

The polymerization of the monomers M may be carried out in the presence of a chain transfer agent. In this way, the molar mass of the polymer is controlled. Suitable chain transfer agents are, in particular, compounds having a thiol group, e.g. tert-butyl mercaptan, mercaptoethanol, mercaptopropanol, mercaptobutanol, thioglycolic acid, alkyl thioglycolates, such as ethyl thioglycolate, butyl thioglycolate or 2-ethylhexyl thioglycolate, mercaptopropionic acid, alkyl mercaptopropionate and tert-dodecyl mercaptan. Further suitable chain transfer agents are alkali metal phosphonates and hypophosphites. Organic solvents which have at least one OH group bound to an aliphatic carbon atom, for example $C_1$-$C_4$-alkanols, such as ethanol, isopropanol, 2-butanol or tert-butanol, also act as chain transfer agents. The amount of chain transfer agent, if present, is e.g. in the range from 0.5 to 20% by weight, in particular in the range from 1 to 15% by weight, based on the total amount of the monomers M to be polymerized.

Organic solvents having OH groups can also be used in greater amounts since they have only a weak chain transfer action.

The homopolymerization of the monomers of formula (I) or the copolymerization of the monomers of formula (I) and the one or more monomers M2 can be carried out as a batch process or as a monomer feed stream process. In a monomer feed stream process the major part, preferably at least 80% and in particular at least 90% of the monomers M to be polymerized are introduced into the polymerization reactor during the course of the polymerization under polymerization conditions. The introduction can be carried out continuously or stepwise. During the polymerization, the monomer composition can be altered once, a number of times or continuously (gradated mode of operation).

The radical polymerization may be carried out in the presence of a solvent or in bulk. Suitable solvents are those which are inert under the polymerization reaction conditions. Preferably, the solvent increases the solubility of at least one of the monomers in the reaction medium. Examples include

- esters, e.g. $C_1$-$C_{12}$-alkyl esters, $C_5$-$C_{12}$-cycloalkyl esters, and $C_1$-$C_4$-alkoxy-$C_2$-$C_4$-alkyl esters of $C_1$-$C_{12}$ monocarboxylic acids, in particular of acetic acid, propionic acid or butyric acid, such as ethyl acetate, propyl acetate, butyl acetate, 2-methoxyethyl acetate, methoxypropyl acetate, cyclohexyl acetate and the like;
- lactams, such as N-methylpyrrolidone;
- water-miscible organic solvents are, for example, $C_1$-$C_4$-alkanols, e.g. methanol, ethanol, n-propanol, isopropanol, n-butanol, isobutanol, 2-butanol or tert-butanol, glycols, such as ethylene glycol, diethylene glycol, water, and
- mixtures of water and one or more water-miscible organic solvents are, for example, mixtures of water and one or more $C_1$-$C_4$-alkanols.

Polymerization temperature and polymerization pressure are of subordinate importance. The emulsion polymerization is typically carried out at temperatures in the range from 30 to 130° C., preferably in the range from 50 to 100° C. The polymerization pressure is usually in the region of atmospheric pressure, i.e. ambient pressure, but can also be slightly above or below this, e.g. in the range from 800 to 1500 mbar.

The progress of the polymerization reaction can be monitored by any suitable method known by the skilled person. It is well known that the progress of polymerization reactions can be monitored by analysing the content of unreacted olefinic double bonds by means of spectroscopic analysis, e.g. by NMR spectroscopy, in particular by $^1$H-NMR spectroscopy.

The polymers of the presently claimed invention act as a dispersant or wetting agent for solid fine particulate materials, such as organic and inorganic pigments and fillers, in particular as dispersants in liquid dispersions of said solid fine particulate material, i.e. they stabilize the solid particles of the solid fine particulate material in a liquid composition of the solid fine particulate material. Stabilization means that the dispersant separates the solid particles and prevents them from coagulation or clumping and settling from the liquid composition. These benefits can be achieved by the polymers even at high solids content, e.g. at concentrations of the solid particulate material of 30% by weight or more, based on the total weight of the liquid compositions. Moreover, the polymers also enhance its rheology which is normally difficult to achieve at high solids content. The polymers also improve the gloss of a coating which is obtained when the liquid composition containing the polymer and a solid particulate material is coated to a substrate.

Without being bound to theory, it is believed that these beneficial effects are based on the following mechanisms: The anthranilamide moieties have affinity to the surface of the solid particles and thereby provide a strong physical binding of the dispersant to the solid particles. The polyalkyleneoxide moieties (II), on the other hand, can interact with the liquid dispersant phase to build up a steric environment to stabilize pigment/filler dispersions.

Therefore, another aspect of the presently claimed invention relates to a liquid composition, comprising at least one polymer of the presently claimed invention, the liquid composition being in form of a liquid dispersion comprising a fine particulate solid material.

Further aspects of the presently claimed invention relate to the use of the polymer of the presently claimed invention as dispersing agent for a particulate solid material, as wetting agent, and as thickening agent in aqueous liquid compositions.

The polymers of the presently claimed invention are especially useful as dispersant in liquid coating compositions containing solid fine particles, such as organic or inorganic pigments and fillers, in particular coating compositions which, besides the polymer of the presently claimed invention, contain a conventional polymer binder.

The presently claimed invention thus also relates to liquid compositions in the form of a dispersion which comprise a fine particulate solid material, selected from the group consisting of pigments and fillers, a liquid diluent, wherein the fine particulate solid material is dispersed in the liquid diluent, further comprising the polymer as defined herein and in the claims. The presently claimed invention relates to liquid compositions in the form of coating compositions, millbase and inks.

The presently claimed invention also relates to liquid coating compositions which comprise a fine particulate solid material, selected from the group consisting of pigments and fillers, a liquid diluent, wherein the fine particulate solid material is dispersed in the liquid diluent, further comprising the polymer as defined herein and in the claims and optionally a polymer binder.

As pointed out above, the polymer of the presently claimed invention is particularly suitable as a dispersant, in particular as a dispersant for fine particulate solids, such as pigments and fillers.

The polymer of the presently claimed invention can be used as dispersant in broad application fields, such as coatings, inks, electronic materials, especially in low temperature and low viscosity applications. The polymer can be used in water based systems, such as latex paints, solvent based systems, such as in solvent based organic and inorganic pigments dispersion, e.g. in alkyd, CAB (cellulose acetate butyrate), UV (Ultraviolet) and TPA (thermoplastic acrylate) paint systems, in general industrial coatings especially in automotive coatings, as well as in printing inks and graphic arts.

An aspect of the presently claimed invention thus relates to a liquid composition comprising at least one polymer of the presently claimed invention, which is in form of a liquid dispersion comprising a fine particulate solid material. Examples of fine particulate solid materials are pigments or fillers.

The presently claimed invention also relates in particular to liquid compositions in the form of a dispersion comprising a fine particulate solid material, in particular a pigment or filler, which is dispersed in a liquid diluent which composition further contains a polymer of the presently claimed invention.

The presently claimed invention also relates in particular to liquid compositions in the form of a liquid coating composition which comprises a fine particulate solid material, in particular a pigment or filler, which is dispersed in a liquid diluent which composition further contains a polymer of the presently claimed invention.

The presently claimed invention also relates in particular to liquid compositions in the form of a liquid ink composition which comprises a fine particulate solid material, in particular a pigment or filler, which is dispersed in a liquid diluent which composition further contains a polymer of the presently claimed invention.

Suitable solid fine particular materials include, but are not limited to the group consisting of pigments and fillers. Pigments may be inorganic or organic. Pigments include colored pigments and pearlescents.

The size of the fine particulate material is preferably in the micrometer range, e.g. the weight average particle diameter may range from 1 μm to 2000 μm, in particular from 2 μm to 1000 μm or from 5 μm to 500 μm. The weight average particle diameter may be determined by sieving analysis. The weight average particle diameter may be also be determined by light scattering methods.

Examples of suitable organic pigments are pigments and pearlescent flakes selected from the group consisting of azo, disazo, naphthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthanthrones, isoviolanthrones, diketopyrrolopyrrole, and carbazoles, e.g. carbazole violet, and the like. Further examples of organic pigments can be found in the monograph: W. Herbst, K. Hunger *"Industrielle Organische Pigmente"* $2^{nd}$ *Edition*, 1995, *VCH Verlagsgesellschaft*, ISBN: 3-527-28744-2.

Examples of suitable inorganic pigments are e.g. metallic flakes, such as aluminium, aluminium oxide, calcium carbonate, silicon oxide and silicates, iron(III)oxide, chromium (III)oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead(IV)chromate, and molybdates, such as lead(IV)molybdate, and mixtures, crystal forms or modifications thereof, such as rutil, anatas, mica, talcum or kaolin.

Suitable fillers are calcium carbonate, silicates, glass fibres, glass beads, talc, kaolin, mica, barium sulphate, metal oxides and hydroxides, carbon black, graphite, wood powders, powders and fibres of other natural products, synthetic fibres.

The liquid diluent present in the dispersion will depend on the field of application in a known manner. The polymers of the presently claimed invention are particular useful in dispersions, wherein the diluent is selected from commonly used solvents in coatings technology. For water based formulations the diluent comprises water and may, aside from water, further comprise polar, water-miscible solvents, such as $C_1$-$C_4$ alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol or propylene glycol. For solvent based formulations, preferably less polar solvents like aliphatic hydrocarbons, esters like butyl acetate, or glycol ethers like methoxypropylene glycol or glycol ether esters like methoxypropylene glycol acetate are used and mixtures thereof are used as liquid diluents.

Preferably, the weight ratio of fine particulate solid material to the polymer of the presently claimed invention in the liquid composition may range from 100:1 to 1:50, in particular from 30:1 to 1:10.

In a particular embodiment of the presently claimed invention, the liquid composition comprises
i) 1 to 70% by weight, in particular 2 to 50% by weight, based on the total weight of the liquid composition, of at least one fine particulate solid material, selected from the group consisting of pigments and fillers;
ii) 0.5 to 50% by weight, in particular from 1 to 30% by weight, based on the total weight of the liquid composition, of at least one polymer as defined herein;
iii) 10 to 98.5%, in particular from 20 to 97% by weight, based on the total weight of the liquid composition, of at least one liquid diluent.

Depending on the intended use, the liquid composition may further comprise binders and/or one or more conventional additives depending on the intended use. Conventional additives included e.g. plasticisers, lubricants, emulsifiers, humectants, rheology additives, catalysts, flow auxiliaries, optical brighteners, flame retardants, preservatives, antistatic agents or blowing agents.

The liquid dispersion may be in the form of a millbase. Such a millbase contains the fine particulate solid, the polymer of the presently claimed invention and the liquid diluent and optionally additives but generally millbase will not contain binders.

The liquid dispersion may also be in the form of a coating composition. Such a coating composition contains the fine particulate solid, the polymer of the presently claimed invention and the liquid diluent and additionally one or more binders, e.g. film-forming polymers or prepolymers which form a film upon curing. Coating compositions may optionally contain conventional additives conventionally used in coating technology, e.g. plasticisers, lubricants, emulsifiers, rheology additives, catalysts, flow auxiliaries, optical brighteners, flame retardants, preservatives, antistatic agents or blowing agents.

The liquid dispersion may also be in the form of an ink, e.g. a printing ink or a gravure ink. Such an ink contains the fine particulate solid, the polymer of the presently claimed invention and the liquid diluent and additionally one or more binders conventionally used in ink technology, e.g. film-forming polymers or prepolymers which form a film upon curing. Inks may optionally contain conventional additives, e.g. plasticisers, lubricants, emulsifiers, humectants, rheology additives, humectants, preservatives and antistatic agents.

Suitable binders are the ones customarily used, for example the ones described in *Ullmann's Encyclopedia of Industrial Chemistry*, 5th Edition, Vol. A18, pp. 368-426, *VCH, Weinheim* 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Also resins curable by radiation or air-drying resins can be used. Binders may also be derived from polyvinylalcohol and polyvinylbutyral.

If cold- or hot-curable binders are used, the addition of a curing catalyst may be advantageous. Suitable catalysts that accelerate the curing of binders are described, for example, in *Ullmann's*, Vol. A18, loc. cit., p. 469.

Preference is given to coating compositions comprising a polymer of the presently claimed invention and a crosslinkable resin. Examples of coating compositions containing specific binders are:

Paints based on cold- or hot-cross linkable alkyd, acrylate, polyester, epoxy or melamine resins or mixtures of such resins, if desired with addition of a curing catalyst;

Two-component polyurethane paints based on hydroxyl-containing acrylate, polyester or polyether resins and aliphatic or aromatic isocyanates, isocyanurates or polyisocyanates;

One-component polyurethane paints based on blocked isocyanates, isocyanurates or polyisocyanates which are deblocked during baking, if desired with addition of a melamine resin;

One-component polyurethane paints based on a trisalkoxycarbonyl triazine cross linker and a hydroxyl group containing resin, such as acrylate, polyester or polyether resins;

One-component polyurethane paints based on aliphatic or aromatic urethane acrylates or polyurethane acrylates having free amino groups within the urethane structure and melamine resins or polyether resins, if necessary with curing catalyst;

Two-component paints based on (poly)ketimines and aliphatic or aromatic isocyanates, isocyanurates or polyisocyanates;

Two-component paints based on (poly)ketimines and an unsaturated acrylate resin or a polyacetoacetate resin or a methacrylamidoglycolate methyl ester;

Two-component paints based on carboxyl- or amino-containing polyacrylates and polyepoxides;

Two-component paints based on acrylate resins containing anhydride groups and on a polyhydroxy or polyamino component;

Two-component paints based on acrylate-containing anhydrides and polyepoxides;

Two-component paints based on (poly) oxazolines and acrylate resins containing anhydride groups, or unsaturated acrylate resins, or aliphatic or aromatic isocyanates, isocyanurates or polyisocyanates;

Two-component paints based on unsaturated polyacrylates and polymalonates;

Thermoplastic polyacrylate paints based on thermoplastic acrylate resins or externally cross linking acrylate resins in combination with etherified melamine resins; and Paint systems based on siloxane-modified or fluorine-modified acrylate resins.

In a first embodiment, the coating composition preferably comprises 0.01 to 100.0 parts by weight of the combined components i) and ii), i.e. fine particulate solid and polymer, in particular 0.05 to 50.0 parts, especially 0.1 to 20.0 parts, per 100 parts by weight of solid binder.

For preparing the liquid composition of the presently claimed invention, the pigments are generally dispersed in the liquid diluent in the presence of the polymer. The dispersion can be achieved by using conventional techniques, such as high speed mixing, ball milling, sand grinding, attritor grinding or two or three roll milling. The resulting pigment dispersion may have a pigment to dispersant weight ratio in the above range. The thus obtained dispersion is also termed as a millbase.

For preparing the coating composition or an ink the millbase will generally be incorporated, e.g. by mixing, into a liquid composition of the binder. It is, however, also possible to disperse the fine particulate solid in a solution of the polymer, concentrate the resulting mixture by distilling off the solvents and/or water, preferably to dryness, and optionally further subjecting the resulting concentrate to thermal and/or mechanical treatment to prepare a mixture comprising pigments and modified copolymers which may then be subsequently dispersed in a liquid binder formulation. According to this process, the solid composition of fine particulate solid and polymer is easy to disperse and does not require time and energy intensive grinding to be incorporated into e.g. a paint formulation.

The presently claimed invention is hereinafter also described by way of examples.

PREPARATION EXAMPLES

ABBREVIATIONS b.w. by weight
BHT butylhydroxytoluol
DABCO 1,4-Diazabicyclo[2.2.2]octan
DMAEMA 2-(N,N-Dimethylamino)ethyl methacrylate
IA isatoic anhydride
MFT minimum film forming temperature
Starting Materials

TABLE 1

Commercially available poly($C_2$-$C_4$-alkylene oxides) and macromonomers:

| Name of poly($C_2$-$C_4$-alkylene oxide) | Number of repeating units | Supplier |
|---|---|---|
| Polyether 1: methyl polyethylene glycol, molecular mass approx. 500 g/mol | 11 | BASF |
| Polyether 2: methyl polyethylene glycol, molecular mass approx. 2000 g/mol) | 45 | BASF |
| Polyether 3: ethoxylated $C_{16}$/$C_{18}$ fatty alcohol | 11 | BASF |

Synthesis

Anthranilic Ester 1

A mixture of Polyether 1 (50 g, 0.1 mol OH), IA (16.3 g, 0.1 mol) and DABCO (0.2 g, 0.3 wt %) was heated to 60 to 140° C. until no more formation of gas ($CO_2$) could be observed. The obtained product was a brownish liquid with an amine number of 85 mg KOH/g. Amine numbers of this and other examples were determined according to DIN 53176:2002-11.

Anthranilic Ester 2

A mixture of Polyether 2 (200 g, 0.1 mol OH), IA (17.9 g, 0.11 mol) and DABCO (0.6 g, 0.3 wt %) was heated to 80 to 140° C. until no more formation of gas ($CO_2$) could be observed. The obtained product was a yellowish solid with an amine number of 27 mg KOH/g.

Anthranilic Ester 3

A mixture of Polyether 3 (74 g, 0.1 mol OH), IA (16.3 g, 0.10 mol) and DABCO (0.27 g, 0.3 wt %) was heated to 80 to 140° C. until no more formation of gas ($CO_2$) could be observed. The obtained product was a yellowish solid with an amine number of 63 mg KOH/g.

Macromonomer 1

A mixture of anthranilic ester 1 (62 g, 0.1 mol), methacrylic anhydride (15.4 g, 0.1 mol) and BHT (0.01 g) was reacted at 80° C. for 4 hours under $N_2$ gas. The methacrylic acid by-product was removed under vacuum. The obtained product was a brownish liquid.

Macromonomer 2

A mixture of anthranilic ester 2 (210 g, 0.1 mol), methacrylic anhydride (18.0 g, 0.12 mol) and BHT (0.01 g) was reacted at 80° C. for 4 hours under $N_2$ gas. The methacrylic acid by-product was removed under vacuum. The obtained product was a yellowish solid.

Macromonomer 3

A mixture of of anthranilic ester 3 (86 g, 0.1 mol), methacrylic anhydride (17.0 g, 0.11 mol) and BHT (0.01 g) was reacted at 80° C. for 4 hours under $N_2$ gas. The methacrylic acid by-product was removed under vacuum. The obtained product was a yellowish wax.

Dispersants 1 to 10, General Synthesis

A mixture of macromonomer and comonomer(s) (as specified in table 2), butyl acetate (100 g) and azo-bis (isobutyronitril) (2.4 g, 0.015 mol) was charged into a reactor and purged with $N_2$ gas for 2 hours, followed by heating to an inside temperature of 60° C. for 20 hours. $^1$H-NMR analysis indicated quantitative conversion of the carbon-carbon double bonds. The butyl acetate was removed under vacuum and the evaporation residue was dissolved in the solvent indicated in table 2. The amount of solvent used for dissolving the evaporation residue was 1.5 times the total mass of the monomers in order to ensure that all dispersants contain 40 wt % of solid.

TABLE 2

| | Dispersants | | |
|---|---|---|---|
| Dispersant | Macro-monomer (0.1 mol) | Comonomer(s) (0.1 mol of each Comonomer) | Solvent |
| 1 | 1 | Styrene, Methacrylic acid | Water |
| 2 | 2 | Styrene, Methacrylic acid | Water |
| 3 | 3 | Styrene, Methacrylic acid | Methoxypropyl acetate |
| 4 | 1 | Styrene, DMAEMA | Water |
| 5 | 2 | DMAEMA | Water |
| 6 | 1 | [2-(Methacryloyloxy)ethyl]-trimethylammonium chloride | Water |
| 7 | 1 | 1-Vinylimidazole | Water |
| 8 | 1 | Styrene, Dimethylacrylamide | Water |
| 9 | 1 | Styrene Acryloyl morpholine | Water |
| 10[1] | MPEG350MA[2] | [2-(Methacryloyloxy)ethyl]-trimethylammonium chloride | Water |

[1] comparative example

[2] methyl polyethylene glycol methacrylate, molecular mass approx. 430 g/mol

Performance Testing

In order to test the dispersion effect of the obtained samples, resin free pigment concentrates (millbase) were prepared according to Formulation 1 (table 3). The millbase was dispersed in Scandex Shaker for 1 hour with the help of glass beads. Afterwards the millbase was filtered and stored at room temperature overnight. The rheological behavior of the millbases was measured with a Thermo-Haake Rheo-Stress 600 equipment under the CR mode at 22° C. and a shear rate of 1 $sec^{-1}$ (Spindle CP50).

TABLE 3

| Formulation 1 - Preparation of Pigment Concentrates (Millbases) | |
|---|---|
| Dispersant (40% solid) | 0.82 g |
| Water | 16.5 g |
| Pigment: $TiO_2$ Pigment [1] | 32.5 g |
| Defoamer, paraffin based | 0.18 g |
| 2.0 mm glass beads | 100 g |
| Total | 150 |

[1] Commercial rutile type titanium dioxide pigment

The performance of the dispersants was generally very good with low millbase viscosity (table 4).

TABLE 4

| Millbase viscosity (Viscosity @ 1 $S^{-1}$) | |
|---|---|
| Dispersant | mpas |
| Blank (without dispersant) | 1100 |
| 1 | 50 |
| 2 | 70 |
| 3 | 510 |
| 6 | 80 |
| 10[1] | 200 |

Let-down paints (Formulation 2) were prepared by stirring at 2000 rpm for 5 minutes (table 5).

TABLE 5

| Formulation 2 - Let-down Paints | | |
|---|---|---|
| Millbase | 21.0 g | |
| Calcium carbonate filler | 15.4 g | Omyacarb 5 GU |
| Talcum filler | 4.00 g | Finntalc M15 |

TABLE 5-continued

Formulation 2 - Let-down Paints

| | | |
|---|---|---|
| Water based transparent varnish | 38.2 g | Klarlack 436 [1] |
| Water | 1.4 g | |
| Total | 80.0 g | |

[1] Composition of Klarlack 436:
1 wt % Paraffin based defoamer
2.5 wt % Propylene glycol
2.5 wt % Butyl diglycol
87 wt % 50% b.w. aqueous acrylate latex, MFT 17° C., particle size 0.1 nm.
4 wt % Polyether based rheology modifier, 30% b.w. aqueous solution
3 wt % Water The let-down paints were applied on PET films with a 250 μm wet coating thickness. The gloss of the obtained coatings at 60° angle was determined according to DIN 67530 using a commercial reflectometer (Micro-Tri-Gloss reflectometer from BYK Gardner). Seedings: The stability of the paints, i.e. the dispersants' capability of preventing solid fine particulate material from coagulation and clumping, was quantified by visual inspection of the coatings. The absence of seedings indicated high stability. Lots of seedings indicated low stability (table 6).

TABLE 6

Dispersion effects

| Example | Gloss (60°) | Stability[2] |
|---|---|---|
| Blank (without dispersant)[1] | 75 | 4 |
| Dispersant 1 | 86 | 1 |
| Dispersant 2 | 84 | 1 |
| Dispersant 3 | 80 | 2 |
| Dispersant 6 | 83 | 1 |
| Dispersant 10[1] | 80 | 2 |

[1] comparative
[2] 1 = no seeding, 2 = few seedings, 3 = some seedings, 4 = many seedings, 5 = lots of seedings The performance of the dispersant is very good with satisfactory results, e.g. low millbase viscosity, high gloss and stability (tables 4 and 6).

The invention claimed is:

1. A compound of formula (I)

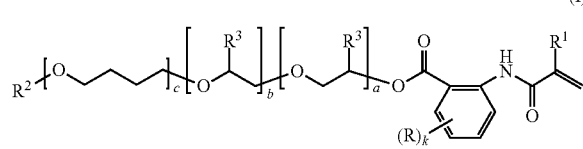

(I)

where
each R is independently halogen, OH, $NO_2$, $C_1$-$C_4$-alkyl, $C_1C_4$-alkoxy, $CONH_2$, NH—CHO, NH—$C_1C_4$-alkyl, or NH—(C=O)—$C_1$-$C_4$-alkyl;
k is 0, 1, 2, 3 or 4;
$R^1$ is hydrogen or $C_1$-$C_4$-alkyl;
$R^2$ is hydrogen or $C_1$-$C_{40}$-hydrocarbyl;
each $R^3$ is independently hydrogen or $C_1$-$C_2$-alkyl;
a is from 0 to 1500;
b is from 0 to 1500; and
c is from 0 to 750,
wherein a+b+c is from 2 to 1500; and
the "a" repeating units [—O—$CH_2$—CH($R^3$)—], the "b" repeating units [—O—CH($R^3$)—$CH_2$—] and the "c" repeating units [—O—$CH_2CH_2CH_2CH_2$—] are distributed statistically or form a gradient or a block structure.

2. The compound of formula (I) according to claim 1, wherein c is 0.

3. The compound of formula (I) according to claim 1, wherein $R^2$ is $C_1$-$C_{40}$-hydrocarbyl.

4. The compound of formula (I) according to claim 1, wherein a+b+c is from 2 to 500.

5. The compound of formula (I) according to claim 1, wherein k is 0.

6. The compound of formula (I) according to claim 1, wherein $R^1$ is hydrogen or methyl.

7. The compound of formula (I) according to claim 1, wherein $R^3$ is hydrogen or methyl.

8. A method for preparing the compound of formula (I) according to claim 1, the method comprising
i) reacting a polyalkyleneoxide of formula (II-H)

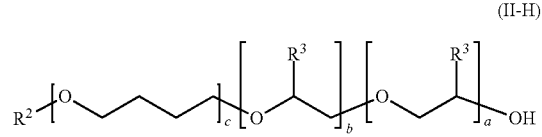

(II-H)

where $R^2$, $R^3$, a, b and c are as defined in claim 1;
with an unsubstituted or substituted isatoic anhydride or an ester forming derivative of unsubstituted or substituted anthranilic acid to obtain a product, wherein the substituted isatoic anhydride and substituted anthranilic acid are substituted with k substituents R on the phenyl ring, wherein R and k are as defined in claim 1; and
ii) reacting the product obtained in i) with a compound of formula (III)

$$CH_2=C(R^1)—C(O)—X$$ (III)

where $R^1$ is as defined in claim 1 and X is halogen, $C_1$-$C_4$-alkoxy or $CH_2=C(R^1)—C(O)—$.

9. The method according to claim 8, wherein the compound of formula (III) is acrylic anhydride or methacrylic anhydride.

10. A polymer having a C—C-backbone, comprising repeating units of formula (IV),

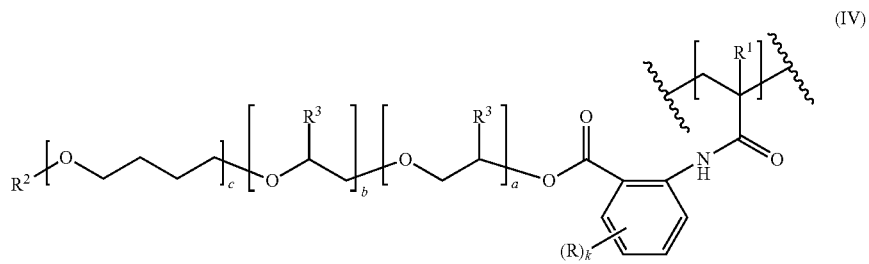

(IV)

where R, $R^1$, $R^2$, $R^3$, a, b, c and k are as defined in claim 1,
wherein
the "a" repeating units [—O—CH$_2$—CH($R^3$)—], the "b" repeating units [—O—CH($R^3$)—CH$_2$—] and the "c" repeating units [—O—CH$_2$CH$_2$CH$_2$CH$_2$—] are distributed statistically or form a gradient or a block structure.

11. A polymer, obtained by a process comprising: polymerizing monomers M, comprising at least one monomer of formula (1) as defined in claim 1.

12. The polymer according to claim 11, wherein the monomers M further comprise at least one monomer M2, which is an ethylenically unsaturated compound different from the compound of formula (I).

13. The polymer according to claim 12, wherein the monomer M2 is selected from the group consisting of a vinylaromatic hydrocarbon, a monoethylenically unsaturated carboxylic acid, a primary amide of a monoethylenically unsaturated carboxylic acid, an N-mono-$C_1$-$C_{20}$-alkyl amide of a monoethylenically unsaturated carboxylic acid, an N,N-di-$C_1$-$C_{20}$-alkyl amide of a monoethylenically unsaturated carboxylic acid, a $C_1$-$C_{20}$-alkyl ester of a monoethylenically unsaturated carboxylic acid, a $C_3$-$C_{10}$-cycloalkyl ester of a monoethylenically unsaturated carboxylic acid, a (di-$C_1$-$C_{20}$-alkylamino-$C_2$-$C_4$-alkyl) ester of a monoethylenically unsaturated carboxylic acid, a (tri-$C_1$-$C_{20}$-alkylammonium-$C_2$-$C_4$-alkyl) ester of a monoethylenically unsaturated carboxylic acids acid, an N (tri-$C_1$-$C_{20}$-alkylammonium-$C_2$-$C_4$-alkyl) amide of a monoethylenically unsaturated carboxylic acid, an N-(di-$C_1$-$C_{20}$-alkylamino-$C_2$-$C_4$-alkyl) amide of a monoethylenically unsaturated carboxylic acid, a vinyl substituted heterocycle, and a morpholide of a monoethylenically unsaturated carboxylic acid.

14. The polymer according to claim 13, wherein the monomer M2 is selected from the group consisting of styrene, acrylic acid, methacrylic acid, fumaric acid, itaconic acid, maleic acid, 2-(N,N-dimethylamino)ethyl methacrylate, (2-(methacryloyloxy)-ethyl)trimethyl ammonium chloride, 1-vinylimidazole, dimethylacrylamide, and N-acryloylmorpholine.

15. The polymer according to claim 11, wherein the monomer of formula (I) makes up from 1 mol-% to 99 mol-% of monomers M.

16. A method for preparing the polymer according to claim 11, the method comprising: polymerizing monomers M via a free radical polymerization.

17. A liquid composition, comprising at least one polymer according to claim 10, which is in a form of a liquid dispersion.

18. The liquid composition according to claim 17, further comprising a fine particulate solid material, which is a pigment or a filler.

* * * * *